(12) United States Patent
Pergande et al.

(10) Patent No.: US 8,098,191 B1
(45) Date of Patent: Jan. 17, 2012

(54) ELECTRONIC CURTAIN FOR VEHICLE PROTECTION

(75) Inventors: Albert N. Pergande, Orlando, FL (US); Lloyd Dan Griffin, Jr., Plant City, FL (US); Steven G. Gray, Orlando, FL (US); Hung Q. Le, Orlando, FL (US); Steve T. Nicholas, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 611 days.

(21) Appl. No.: 12/265,063

(22) Filed: Nov. 5, 2008

Related U.S. Application Data

(60) Provisional application No. 60/985,336, filed on Nov. 5, 2007.

(51) Int. Cl.
*G01S 13/87* (2006.01)
*G01S 13/88* (2006.01)
*G01S 13/00* (2006.01)

(52) U.S. Cl. .............. 342/61; 342/27; 342/59; 342/62; 342/67; 342/118; 342/128; 342/130; 342/131; 342/132; 342/134; 342/175; 342/195; 89/1.11; 244/3.1

(58) Field of Classification Search ............ 244/3.1–3.3; 89/1.11; 342/59, 61, 62, 27, 28, 118, 126–144, 342/13–20, 82–87, 89, 91, 93, 175, 195, 342/63–68, 159
See application file for complete search history.

(56) References Cited

U.S. PATENT DOCUMENTS

| | | | | | |
|---|---|---|---|---|---|
| 2,433,804 | A | * | 12/1947 | Wolff | 342/131 |
| 2,649,538 | A | * | 8/1953 | Marlowe et al. | 342/27 |
| 2,695,995 | A | * | 11/1954 | Cauchois | 342/130 |
| 2,941,200 | A | * | 6/1960 | De Lange et al. | 342/132 |
| 2,977,587 | A | * | 3/1961 | Herbst | 342/131 |
| 3,114,909 | A | * | 12/1963 | Varela | 342/131 |
| 3,140,489 | A | * | 7/1964 | Downie | 342/132 |
| 3,161,870 | A | * | 12/1964 | Pincoffs | 342/59 |
| 3,188,637 | A | * | 6/1965 | Mortley | 342/132 |
| 3,196,437 | A | * | 7/1965 | Mortley et al. | 342/132 |
| 3,274,595 | A | * | 9/1966 | Page | 342/16 |
| 3,286,955 | A | * | 11/1966 | French et al. | 244/3.14 |
| 3,691,558 | A | * | 9/1972 | Hoard et al. | 342/28 |
| 3,866,224 | A | * | 2/1975 | Porter et al. | 342/16 |
| 3,934,253 | A | * | 1/1976 | Wiedemann et al. | 342/134 |
| 3,945,011 | A | * | 3/1976 | Glasgow | 342/132 |
| 3,953,856 | A | * | 4/1976 | Hammack | 342/126 |
| 3,979,748 | A | * | 9/1976 | Gellekink | 342/132 |
| 3,996,590 | A | * | 12/1976 | Hammack | 342/126 |
| 4,110,755 | A | * | 8/1978 | Zottl | 342/132 |
| 4,136,341 | A | * | 1/1979 | Mulder et al. | 342/132 |

(Continued)

FOREIGN PATENT DOCUMENTS

EP    1605225 A1    12/2005

*Primary Examiner* — Bernarr Gregory
(74) *Attorney, Agent, or Firm* — Jeffrey D. Myers; Peacock Myers, P.C.; Timothy D. Stanley

(57) ABSTRACT

An apparatus and method for protecting against incoming projectiles comprising transmitting two radar waveforms, the first waveform comprising a pulsed continuous wave waveform, and the second waveform comprising a pulsed linear chirp waveform over a bandwidth, and based on returned radar data, causing deployment of a defense mechanism to intercept a detected incoming projectile.

18 Claims, 2 Drawing Sheets

U.S. PATENT DOCUMENTS

| | | | | |
|---|---|---|---|---|
| 4,241,347 A * | 12/1980 | Albanese et al. | | 342/89 |
| 4,347,513 A * | 8/1982 | Schindler | | 342/13 |
| 4,404,562 A * | 9/1983 | Kretschmer et al. | | 342/132 |
| 4,670,755 A * | 6/1987 | Gellekink et al. | | 342/132 |
| 4,673,183 A * | 6/1987 | Trahan | | 342/28 |
| 4,806,936 A * | 2/1989 | Williams et al. | | 342/126 |
| 4,812,035 A * | 3/1989 | Freedman et al. | | 342/87 |
| 4,861,158 A * | 8/1989 | Breen | | 342/83 |
| 4,920,347 A * | 4/1990 | Kurihara | | 342/130 |
| 5,021,791 A * | 6/1991 | Hurd | | 342/93 |
| 5,229,540 A * | 7/1993 | Schabdach et al. | | 89/1.11 |
| 5,661,254 A * | 8/1997 | Steuer et al. | | 244/3.28 |
| 6,610,971 B1 * | 8/2003 | Crabtree | | 244/3.1 |
| 6,720,907 B1 * | 4/2004 | Miron | | 342/195 |
| 7,046,187 B2 * | 5/2006 | Fullerton et al. | | 342/118 |
| 7,066,427 B2 * | 6/2006 | Chang | | 244/3.19 |
| 7,104,496 B2 * | 9/2006 | Chang | | 244/3.19 |
| 7,114,428 B1 | 10/2006 | Lloyd | | |
| 7,190,304 B1 * | 3/2007 | Carlson | | 342/62 |
| 7,202,809 B1 * | 4/2007 | Schade et al. | | 244/3.1 |
| 7,362,261 B2 * | 4/2008 | Flacke | | 342/132 |
| 7,654,185 B1 * | 2/2010 | Yannone | | 89/1.11 |
| 2006/0238403 A1 * | 10/2006 | Golan et al. | | 342/62 |

* cited by examiner

ELECTRONIC CURTAIN FOR VEHICLE PROTECTION

CROSS-REFERENCE TO RELATED APPLICATIONS

This application claims priority to and the benefit of the filing of U.S. Provisional Patent Application Ser. No. 60/985,336, entitled "Electronic Curtain for Vehicle Protection", filed on Nov. 5, 2007, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for protecting vehicles or other targets from projectiles such as rocket-propelled grenades.

2. Description of Related Art

There is a pressing need for anti-Rocket Propelled Grenade protection systems. Some system components are available, including a low velocity pellet defense system that is cued by an optical sensor. It can give good directional information, but has no provision to give the accurate range information needed to generate the very precise timing signal to work correctly. The present invention provides a millimeter wave electronic curtain based on radar with much reduced signal processing requirements to provide this signal.

BRIEF SUMMARY OF THE INVENTION

The present invention is of an apparatus and method for protecting against incoming projectiles, comprising: transmitting two radar waveforms, the first waveform comprising a pulsed continuous wave waveform, and the second waveform comprising a pulsed linear chirp waveform over a bandwidth; and based on returned radar data, causing deployment of a defense mechanism to intercept a detected incoming projectile. In the preferred embodiment, deployment occurs on detection of an amplitude peak distinct from that of ground clutter. Preferably, the waveforms are interleaved, the first waveform employs high pulse repetition frequency, and the bandwidth is at least approximately 500 MHz (most preferably about 500 MHz).

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus for detecting a high velocity projectile and, upon detection, taking active countermeasures. The invention preferably employs a dual waveform implemented in digitally controlled adaptable radar. The first waveform is preferably a pulsed continuous wave (CW) waveform providing detection and velocity measurement capability over a wide variation in initial range to the target, but with only moderate range resolution. The second waveform detects targets only over a very narrow variation in range, but provides extremely accurate range resolution to control fusing. The purpose of the dual waveform is to implement both detection and precise fusing the same low cost radar. Multiple polarizations are preferably used to help discriminate targets from clutter.

Tracking is ordinarily required to assure that a proximity fuse is not triggered by other objects entering its field of regard. The proximity fuse detonates the warhead at the correct time when the tracked target reaches a precisely calculated range.

The present invention takes advantage of highly flexible digital waveform control to preferably implement both functions in one piece of hardware. The initial waveform, a high pulse repetition frequency (HPRF), pulsed CW waveform, detects and identifies the target, providing initial range, velocity, acceleration, and estimated time and speed of arrival. With this information, tracking of the target becomes unnecessary. The second waveform, preferably a pulsed linear chirp waveform over a wide bandwidth (typically 500 MHz or more), sets up an "electronic curtain" at a desired range. This waveform detects a target over a very narrow set of ranges only, but provides very precise range and velocity information on targets entering this set of ranges. When the desired target "pierces the curtain", this velocity information in conjunction with the previous estimates of time and velocity at arrival are used to assure that it is the correct target and to trigger the weapon's warhead. Because one only needs to examine a small range swath and the target always has a very high velocity, one can use very narrow filters and very small data sets to detect the approaching projectile.

Figure 1:
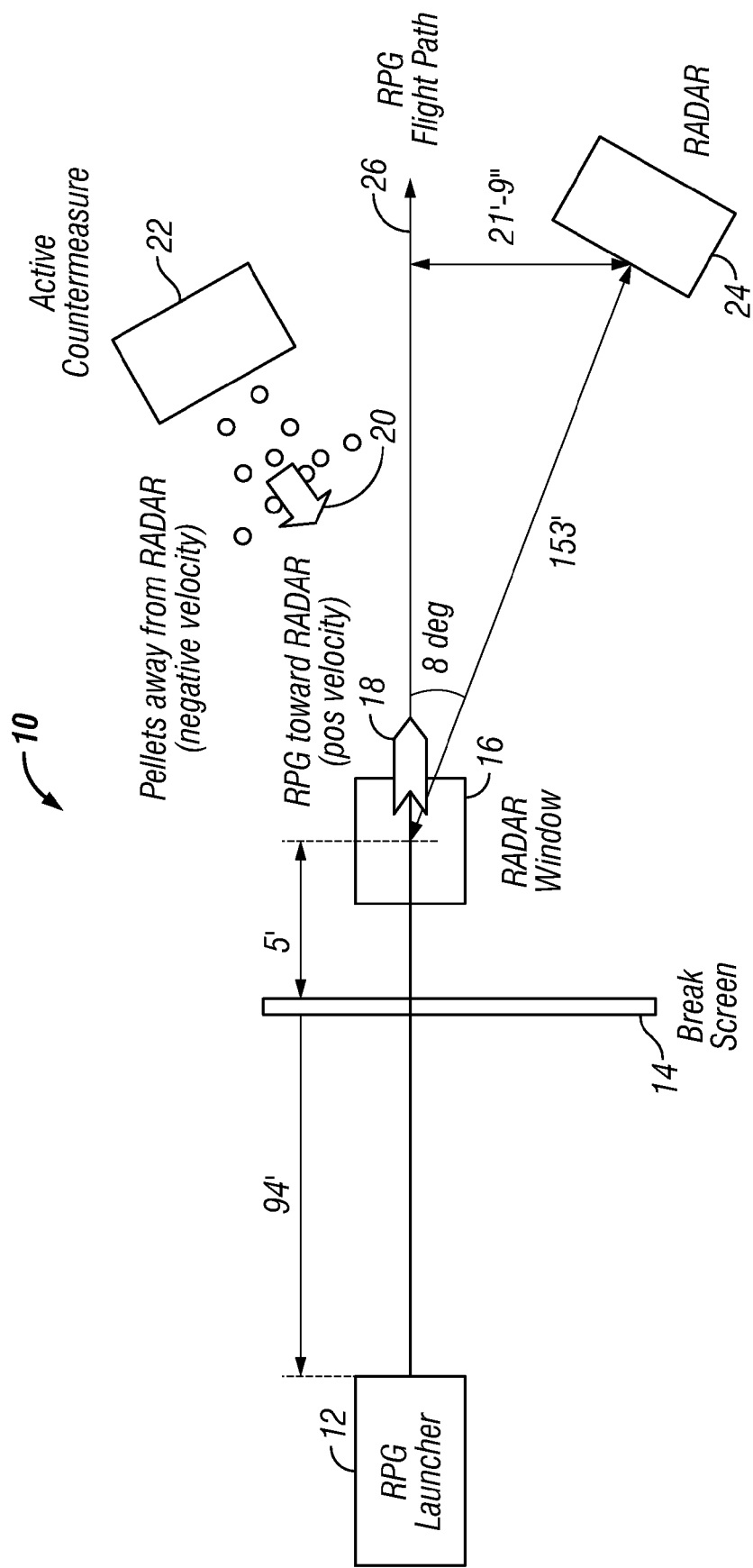
FIG. 1 is a schematic diagram of the apparatus and method of the invention.
Figure 2:
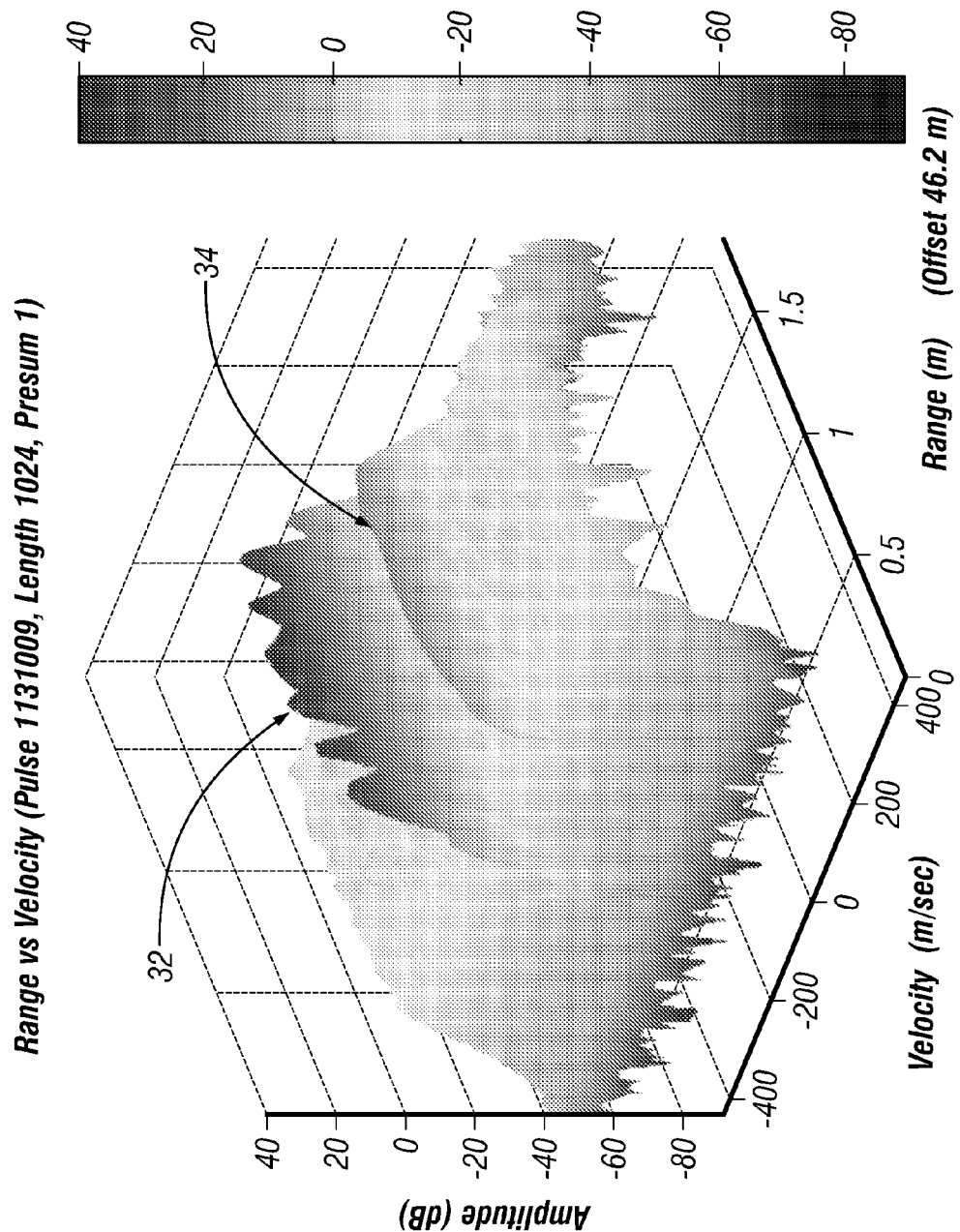
FIG. 2 is a plot of range versus velocity versus amplitude showing a ridge clearly separated from stationary clutter and thus readily detectable.

FIG. 1 shows the invention 10 in schematic form, with optional distances indicated. Radar system 24 generates the waveforms and detects and processes the return signals. A radar window 16 is established, capturing incoming projectiles (such as from a rocket-propelled grenade launcher 12 and passing through optional break screen 14 along a flight path 26 with positive velocity 18. Upon detection of a signal 34 such as shown in FIG. 2 (distinguished from ground clutter 32), the radar system can direct deployment of one or more active countermeasures 22 (such as pellets ejected with negative velocity 20).

Countermeasures other than deployment of pellets include those now known or known in the future in the art, including firing of a high-powered laser, firing of an intercepting missile (with or without explosive effect), deployment of a physical barrier, deployment of electronic countermeasures, and firing of a pulsed energy weapon.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of protecting against incoming projectiles, the method comprising the steps of:
   transmitting two radar waveforms, the first waveform comprising a pulsed continuous wave waveform, and the second waveform comprising a pulsed linear chirp waveform over a bandwidth; and
   based on returned radar data, causing deployment of a defense mechanism to intercept a detected incoming projectile.

2. The method of claim 1 wherein the causing step occurs on detection of an amplitude peak distinct from that of ground clutter.

3. The method of claim 1 wherein the waveforms are interleaved.

4. The method of claim 1 wherein the first waveform employs high pulse repetition frequency.

5. The method of claim 1 wherein the bandwidth is at least approximately 500 MHz.

6. The method of claim 5 wherein the bandwidth is about 500 MHz.

7. An apparatus for protecting against incoming projectiles, said apparatus comprising:
   a radar transmitting two radar waveforms, the first waveform comprising a pulsed continuous wave waveform, and the second waveform comprising a pulsed linear chirp waveform over a bandwidth; and
   a defense system which, based on returned radar data, causes deployment of a defense mechanism to intercept a detected incoming projectile.

8. The apparatus of claim 7 wherein the defense system causes deployment upon detection of an amplitude peak distinct from that of ground clutter.

9. The apparatus of claim 7 wherein the waveforms are interleaved.

10. The apparatus of claim 7 wherein the first waveform employs high pulse repetition frequency.

11. The apparatus of claim 7 wherein the bandwidth is at least approximately 500 MHz.

12. The apparatus of claim 11 wherein the bandwidth is about 500 MHz.

13. A method of detecting incoming projectiles, the method comprising the steps of:
    transmitting two radar waveforms, the first waveform comprising a pulsed continuous wave waveform, and the second waveform comprising a pulsed linear chirp waveform over a bandwidth; and
    based on returned radar data, outputting a signal indicating detection of an incoming projectile.

14. The method of claim 13 wherein the outputting step occurs on detection of an amplitude peak distinct from that of ground clutter.

15. The method of claim 13 wherein the waveforms are interleaved.

16. The method of claim 13 wherein the first waveform employs high pulse repetition frequency.

17. The method of claim 13 wherein the bandwidth is at least approximately 500 MHz.

18. The method of claim 17 wherein the bandwidth is about 500 MHz.

* * * * *